United States Patent [19]

Derode

[11] Patent Number: 4,628,805

[45] Date of Patent: Dec. 16, 1986

[54] APPARATUS FOR PROCESSING CHEESE

[76] Inventor: Bernard Derode, 28, Boulevard d'Inkermann, 92200 Neuilly sur Seine, France

[21] Appl. No.: 758,524

[22] Filed: Jul. 24, 1985

Related U.S. Application Data

[63] Continuation-in-part of Ser. No. 517,829, Jul. 27, 1983, Pat. No. 4,568,554.

[30] Foreign Application Priority Data

Sep. 29, 1982 [FR] France ................................ 82 16365

[51] Int. Cl.4 ............................................. A23C 19/05
[52] U.S. Cl. ........................................ 99/453; 99/459; 99/460; 99/465
[58] Field of Search .................................... 99/452–455, 99/456–459, 460, 465; 426/582, 512, 515, 516; 425/84; 249/127, 141

[56] References Cited

U.S. PATENT DOCUMENTS

| 31,834 | 3/1861 | Stone . | |
|---|---|---|---|
| 254,294 | 2/1882 | Engi . | |
| 2,494,637 | 1/1950 | Stine | 99/116 |
| 2,917,827 | 12/1959 | Lankford . | |
| 3,221,407 | 12/1965 | Jagoueix | 99/458 |
| 3,295,205 | 1/1967 | Sjoholm . | |
| 3,645,751 | 2/1972 | Wakeman | 426/582 |
| 3,732,110 | 5/1973 | Pontecorvo . | |
| 3,836,684 | 9/1974 | Pontecorvo | 426/582 |
| 3,841,210 | 10/1974 | Brog | 99/456 |
| 4,003,490 | 1/1977 | Corbic Nee Bushnel . | |
| 4,058,630 | 11/1977 | Corbic Nee Bushnel . | |
| 4,263,330 | 4/1981 | Streeter et al. | 99/456 X |
| 4,311,087 | 1/1982 | Brinkman | 99/456 |

FOREIGN PATENT DOCUMENTS

| 0023941 | 2/1981 | European Pat. Off. . | |
|---|---|---|---|
| 2166939 | 10/1976 | Fed. Rep. of Germany . | |
| 2020455 | 7/1970 | France | 99/456 |
| 2097557 | 3/1972 | France . | |
| 2215165 | 8/1974 | France . | |
| 2275144 | 1/1976 | France . | |
| 2287166 | 5/1976 | France | 426/512 |
| 2414866 | 8/1976 | France . | |
| 2426406 | 12/1979 | France . | |
| 2428392 | 1/1980 | France . | |
| 2428400 | 1/1980 | France . | |
| 2430721 | 2/1980 | France . | |
| 2432269 | 2/1980 | France . | |
| 2437777 | 4/1980 | France . | |
| 2443199 | 7/1980 | France . | |
| 2443800 | 7/1980 | France . | |
| 2447677 | 8/1980 | France . | |
| 2448287 | 9/1980 | France . | |
| 2448850 | 9/1980 | France . | |
| 2451157 | 10/1980 | France . | |
| 2451708 | 10/1980 | France . | |
| 2451709 | 10/1980 | France . | |
| 2452875 | 10/1980 | France . | |
| 2456467 | 12/1980 | France . | |
| 2456468 | 12/1980 | France . | |
| 2459611 | 1/1981 | France . | |
| 2466188 | 4/1981 | France . | |
| 2470534 | 6/1981 | France . | |
| 2471743 | 6/1981 | France . | |
| 2472420 | 7/1981 | France . | |
| 2473840 | 7/1981 | France . | |
| 2474816 | 8/1981 | France . | |
| 2476438 | 8/1981 | France . | |
| 2478951 | 10/1981 | France . | |
| 2481829 | 11/1981 | France . | |
| 2484380 | 12/1981 | France . | |
| 2489094 | 3/1982 | France . | |
| 2480561 | 4/1982 | France . | |
| 2491291 | 4/1982 | France . | |
| 2491292 | 4/1982 | France . | |
| 2491725 | 4/1982 | France . | |
| 2462253 | 7/1982 | France . | |
| 2429555 | 12/1982 | France . | |
| 2447142 | 12/1982 | France . | |
| 8101071 | 10/1981 | Netherlands | 425/84 |

*Primary Examiner*—Timothy F. Simone
*Attorney, Agent, or Firm*—Fitzpatrick, Cella, Harper & Scinto

[57] ABSTRACT

Soft paste cheese is formed by mixing curd forming additives from burettes (12) to milk flowing in a funnel (11) and directing the resulting curd forming milk mixture into a basin-like receptacle (21) in which a mold block (23) made up of an array of vertically elongated perforated molds (24) of substantially uniform and unobstructed cross section have been placed to fill the receptacle and the molds and, after curds and whey have formed and stratified, removing the whey (34) and lifting the molds as a group onto a draining plate (37), placing inverted molds (39) of like cross section over the molds (24) and turning the mold assembly to turn the cheese (41) therein for further draining and removing the cheese from the molds (39).

19 Claims, 21 Drawing Figures

APPARATUS FOR PROCESSING CHEESE

CROSS REFERENCE TO RELATED APPLICATIONS

This application is a continuation-in-part of copending application Ser. No. 517,829 filed July 27, 1983, now U.S. Pat. No. 4,568,554.

BACKGROUND OF THE INVENTION

1. Field of the Invention

This invention relates to the processing of soft or fresh cheeses which are shaped in molds from which the cheese curd is drained and in particular the invention concerns novel apparatus for manufacturing such cheeses so as to produce a high quality product with minimum curd breakage at miminal cost. While not so limited, the invention is especially advantageous in the production of goat's milk cheese.

2. Description of the Prior Art

To make soft or fresh cheeses, one generally pumps raw milk from a reservoir into a pasteurization or reheating apparatus and then into a curdling receptacle where rennet and fermenting ingredients are added. Once the milk is curdled, the curdled morsels are extracted with a ladle and are disposed in individual perforated molds or special draining baskets.

One important factor on which the quality of the cheese depends is whether or not the curd, which is very delicate, is broken during this operation. Moreover, in order to make the cheese in each mold or draining basket to have the same gradation of weight and consistency from top to bottom, each curd portion which ladled out of the curdling receptacle and into the molds must be put into each mold at the same level corresponding to the level at which it was taken from the curdling receptable. After the cheese portions have drained on one side in their draining basket, they are turned and then returned to their draining basket to be drained on the other side. Thereafter they are disposed in groups on the racks of a dryer, then on those of the drying room.

Thus, each cheese portion must be manufactured individually. Such manufacturing technique is costly in labor, and, as seen from the foregoing, it is not exempt from risks. In addition, in the curdling receptacle, the curd is more or less drained depending on the depth at which it is extracted with the ladle. Thus the different cheese portions that are fabricated in this way are likely not have the same qualities, especially not the same weight since the volume the cheese loses during draining depends, of course, on how much the curd has been drained as of the time it is put into the mold.

It has been proposed in U.S. Pat. Nos. 3,732,110 and 3,836,684 to manufacture soft cheese, i.e. ricotta cheese, by placing a mixture of curd milk mixture into interconnected processing cells or into a common vat at the bottom of which are placed curd-collecting strainer baskets or strainer cannisters. After curds have formed in the cells or the vat, the cells or vat are drained of whey, and the curds, which float on the whey, are directed into the baskets or strainer cannister which are then removed for drying. Although in U.S. Pat. No. 3,732,110 the curds are formed in individual cells, the baskets associated with the cells cannot be handled as a unified group and instead a rather comlex arrangement of support arms and harnesses must be provided. These support arms and harnesses do not allow convenient turning of the cheese in the molds and especially, they do not allow turning of the molds as a group. These harness elements also interfere with the movement of the curds into the basket which may disturb the curdling milk and may cause deterioration of the quality of the cheese. Another difficulty with the arrangement used in U.S. Pat. No. 3,732,110 is that it permits of drainage only at the bottoms of the mold baskets; and the lost curd coming out with the whey may concentrate at the entrance to the drain opening and may obstruct it. In U.S. Pat. No. 3,836,684 the strainer cannisters are arranged so that they could be handled as a group; but they are separated from the common vat in which the curds are formed. Thus the transfer of the curds from the vat into the individual strainer cannisters also subjects the curds to breakage and deterioration of the quality of the cheese.

It has also been proposed in French Pat. No. 2 480 561 to place a plurality of perforated molds in a support obturating the perforations of the molds, then to immerse a plurality of superposed such supports in a vat containing a curd forming milk mixture, to withdraw the supports from the vat, and withdraw the molds from each suppoort when curds has formed, so as to allow whey to drain from the molds. This method entails a considerable waste of curd forming mixture in the vat because said mixture curdles rapidly and must be replaced each time it begins to curdle: clearly, the mixture should not have begun to curdle when the molds are immersed therein, Moreover, handling of the molds and the supports, completely immersed in the vat, is not convenient and needs care as to hygiene.

The apparatus shown in FIGS. 13–19 of this application is shown and described in Spanish Pat. No. 526,034 which was filed on Sept. 28, 1983 and which was granted on Sept. 13, 1984. However, the subject matter disclosed in that patent which is also disclosed in copending U.S. application Ser. No. 517,829, filed July 27, 1983, is not prior art.

SUMMARY OF THE INVENTION

This invention seeks to overcome the above described disadvantages of the prior art and to provide novel apparatus for processing soft cheese which is convenient and inexpensive and which reliably produces cheese of uniformly high quality.

According to one aspect of the invention there is provided novel apparatus for processing soft cheese comprising a plurality of vertically elongated molds of substantially uniform and unobstructed cross section and formed with perforations in at least their lower regions. Means are also provided for containing liquids in said molds while providing communication of said molds with each other through the perforations. Means are provided to place a curd forming milk mixture in the molds. In a preferred arrangement there is inserted in the spaces between the molds and in the space available outside the molds, displacement elements whose volume displaces the curd forming mixture in those spaces and causes it to flow back inside the molds causing the mixture in the molds to be raised to a desired level. Means are also provided to bring and maintain the curd forming milk mixture at a temperature sufficient to cause curds and whey to form within the molds. Further, the means for containing liquids are constructed and arranged to allow selective draining of liquids from the molds through the perforations to permit whey to drain through said perforations after the curds and whey have formed and stratified so that only unbroken curd remains in said molds to form cheeses therein. In the case where the molds are filled while in a basin and the basin is only partly drained either through a siphon at the upper part of the basin or by a tap at the lower part, completion of the drainage will take place after the molds have been lifted up out of the basin and any curd left in the basin can be recovered. This is done by providing a perforate filtering sack as a liner in the basin before the molds are put in. After the molds have been removed the sack is lifted out and the remaining curd will be retained in the sack while the remaining whey drains out.

According to a further feature of the invention novel grid and piston assemblies are provided in association with the molds to enable the cheese to be turned in the molds without abrupt fall.

The apparatus of this invention make possible the efficient and economical production of high quality soft cheese because, with the invention, the cheese curds develop in the very mold in which the cheese is formed and the curds are not transferred from one receptacle to another nor are they subjected to obstructions or radical changes in cross section of the receptacle.

Moreover, the molds do not need to be immersed for being filled. On the contrary, they are filled partly directly, partly through their perforations. No essential handling is necessary in the milk, waste of milk can be widely or even fully avoided and a cumbersome vat and apparatus for handling the molds therein is no longer required.

There is no longer the need of obturating all the perforations of each mold before curd has formed.

The invention includes other more specific features which will be appreciated from the following detailed description of the preferred embodiments.

BRIEF DESCRIPTION OF THE DRAWINGS

Selected preferred embodiments of the invention have been chosen for purposes of illustration and description and are shown in the accompanying drawings forming a part of the specification wherein.

DETAILED DESCRIPTION OF THE PREFERRED EMBODIMENTS

Figures 1, 2:
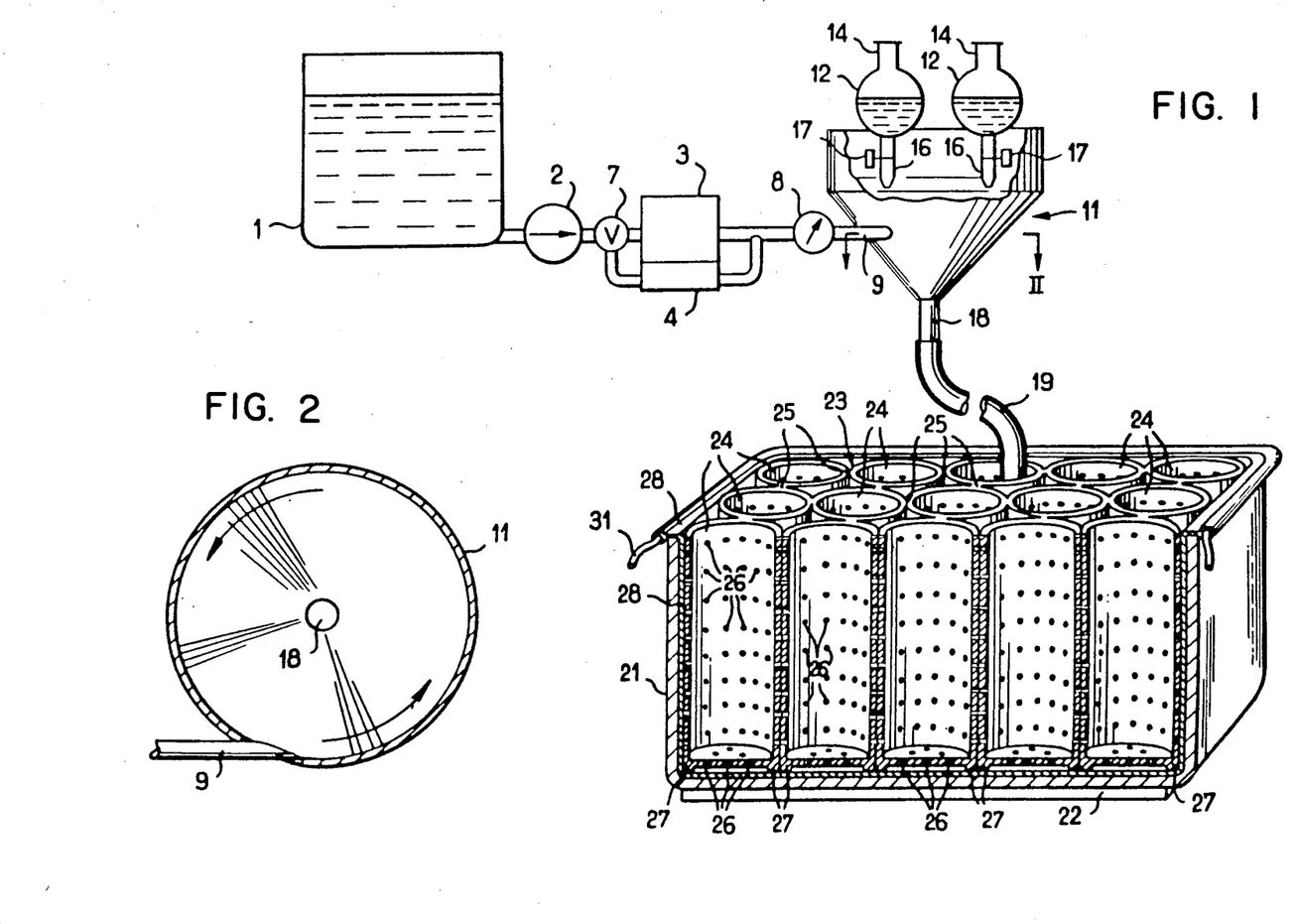
FIG. 1 is a schematic view showing the elements involved in the preliminary stages of a cheese making process according to the invention.
FIG. 2 is a view taken along line II—II of FIG. 1.

As shown in FIG. 1 raw milk, for example, goats milk, contained in a reservoir 1 is pumped therefrom by a pump 2 and is delivered thereby through a pasteurization apparatus 3, for example a Stoutz pasturizer.

Alternatively the milk may be diverted around the pasturizer and through a heater 4. The heater may be a part of the pasturizer. Its role is to deliver the raw milk at the desired temperature even though it has not been heated during pasteurization. A bypass valve 7 is provided to regulate the diversion of milk around the pasturizer. A flow meter 8 is provided at the common exit of the apparatus 3 and the heater 4, and is followed by means for adding some additives to the milk such as ferment, rennet, penicillum, etc.

In accordance with a preferred arrangement, a conduit 9 from the flow meter 8 opens into the interior of the funnel 11 at a tangent to its trunconic wall as shown in FIGS. 1 and 2. By way of example, in an arrangement set up to flow 600 liters of milk per hour the funnel 11 would preferably have a diameter of abut 60 cm. Two burettes 12 are mounted above the funnel 11. The burettes 12 each contain an enlarged central portion, a filling neck 14 at the top and an emptying tube 16 at the bottom. The flow rate out from the emptying tube is controlled by a valve 17. Preferably, means (not shown) are provided to maintain a constant level of fluid in each of the burettes 12. Each burette contains an additive (e.g. ferment, rennet, penicillum) to be added to the milk before the curdling. Of course, there can be any number of burettes 12 according to the particular type of cheese to be processed. The funnel and burette system can be replaced by a classical dosing pump.

The funnel 11 is formed with a bottom exit 18 leading to a supply tube 19 by which the mixture of milk and additive is continuously supplied. The tube 19 extends into a curdling receptacle 21 formed in the shape of a large open top rectangular basin. An electrical heater 22 may be arranged on the underside of the receptacle 21 for maintaining proper temperature in the receptacle where needed for the curd of certain types of cheese. This electrical heater may comprise resistance elements embedded in an insulating layer glued to the bottom of the receptacle.

A mold block 23 is disposed in the curdling receptacle 21. This mold block comprises a number of vertically elongated molds 24 which are of essentially uniform and unobstructed cross section throughout their length. In the embodiment shown the molds 24 are of cylindrical shape and they are connected to each other where they touch along their sides, as shown at 25. The molds 24 may be made of any suitable substance such as metal or plastic and they may be attached to each other by any suitable means such as solder, weldments adhesive or clamps. The attachment of the molds to each other maintains them in an array so that all of the molds may be handled together as a group. The molds 24 in FIG. 1 are open at the top and are closed at the bottom and they are provided with perforations 26 over their side and bottom surfaces. The diameter of the perforations is large enough to permit free flow of the curdling milk mixture into the molds and to permit free flow of whey out from the molds but to prevent flow of curd out from the molds. The bottoms of the molds 24 are formed with feet 27 which rest on the bottom of the basin 21 and hold the bottom surfaces of the molds up off the bottom of the basin so that the curdling milk and whey can freely flow into and out from the bottom of the molds.

The average diameter of the molds 24 corresponds to that of the cheeses to be produced before the eventual drying. The height of the molds, on the other hand, greatly surpasses the vertical height of the cheese to be produced, and corresponds to the quantity of milk necessary to produce cheese having the desired dimensions. That is, for a desired height of cheese to be produced, the molds 24 should each have a height corresponding to the height of the curd forming milk mixture necessary to produce the desired height of cheese. For example, where goat's milk cheeses are to be produced at a height of 10 cm. from an average goat milk the height of the molds 24 should be at least 60 cm. The receptacle or basin 21, of course, must be at least as high at the molds. Also, where a concentrated milk mixture is used, the height of the molds will be less.

The molds 24 are arranged in an array with their axes parallel to each other and they are disposed according to a horizontal plan such that the mold block 23 includes, for example, five rows of five molds each or twenty five molds arrayed in a square.

The interior walls of the receptacle or basin 21 are lined with draining sack 28 of cheesecloth sewed to conform to the shape of the receptacle. The top of the sack 28, which is adjacent to the upper edge 25 of the receptacle or basin 21, is formed with a hem through which a cord 31 is passed.

The operation of the apparatus thus far described will now be given.

Initially, the sack 28 is disposed in the receptable or basin 21 and thereafter the mold block 23 is placed in the receptacle as shown in FIG. 1. It will be seen that the interiors of the several molds 24 are in fluid communication with each other via their perforations 26 and via the small spaces between the exterior sides of the molds 24 and the internal borders of the receptacle 21.

The valves 17 are then regulated to provide a proper rate of flow of curdling fluids. It is preferred first to establish a proper relative rate of flow from the various burettes and then to measure this flow by any appropriate means (not shown) and to control the operation of the milk pump 2 according to such flow. This technique is preferred over that of regulating the flow from the burettes in accordance with the milk flow because very small adjustments in flow from the burettes can have a significant effect on the mixture whereas comparable adjustments of the milk flow have a more moderate effect on the mixture.

The milk arriving in the funnel 11 from the conduit 9 forms a whirlpool in the funnel which homogenizes it by turbulence with the additives which drop from the burettes 12 onto the milk flowing around the inner surface of the funnel, thereby to form a curdling milk mixture.

The milk mixture is flowed from the bottom of the funnel 11 and through the conduit 19 to the receptacle or basin 21 to fill it up to the top of the molds 24. During this operation the molds 24 become filled simultaneously; and at the same time, the small spaces between the receptacle or basin 21 and the molds also become filled. This simultaneous filling of the molds and its spaces between them occurs due to the intercommunication provided by the perforations 26 in the mold surfaces. That is, because the interiors of the molds 24 are in fluid communication with each other via their perforations 26, the curd forming milk mixture, which is supplied at one location of the receptacle or basin, 21 passes into each of the molds 24 via the performations. It will be appreciated that because the molds 24 are densely arranged in the mold block 23 and the mold block 23 itself fits closely inside the receptacle or basin 21, the portion of the curd forming milk mixture which is not actually contained within the molds themselves is very small.

The curd forming milk mixture in the receptacle 21 is maintained at the proper temperature for curdling (i.e. about 25° C.); and the mixture is left immobile at this temperature until curdling occurs (i.e., about 30 minutes). During this time curd 30 (FIG. 3) and whey 32 form and stratify in the receptacle 21 and in the molds 24.

Figure 3:
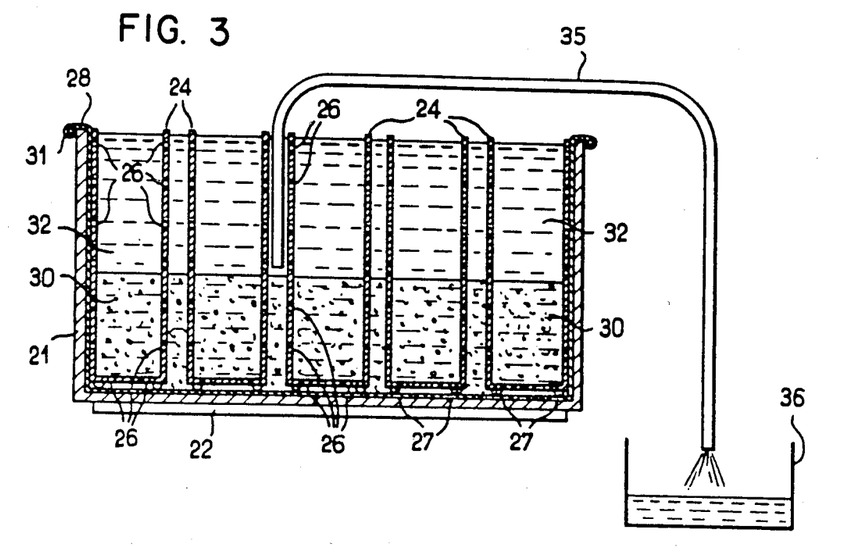
FIG. 3 is a side elevational section view of a curdling receptacle forming one of the elements of FIG. 1.

Depending on which ferments are used, the curd 30 can form at the surface or at the bottom of the molds 24. This latter case is represented in FIG. 3. In either case, it is very important in the making of soft or fresh paste cheese that during the curd formation, the molds 24 are not shaken or vibrated and that no interference is encountered by the curd as it forms in one portion of the mold.

Figure 4:
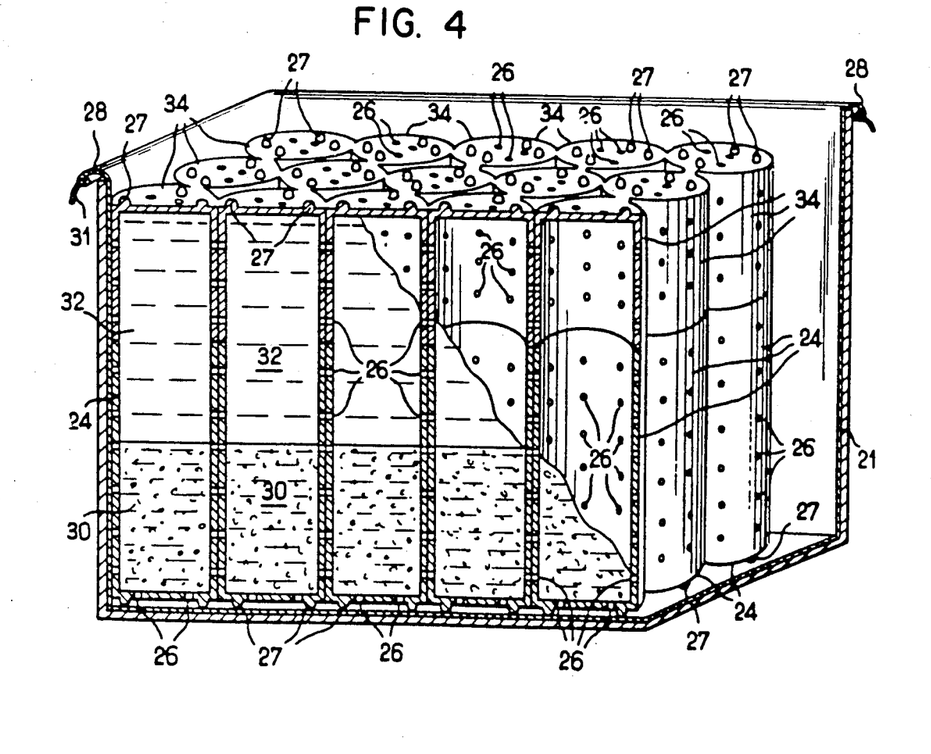
FIG. 4 is a perspective view of a mold block assembly used in a further improvement of the cheese making process according to the invention wherein there is shown a mold having a double end and which can be divided into two parts to allow outmolding of the cheese.

FIG. 4 shows an alternate mold arrangement where there is provided a group of upper molds 34 which are inverted and placed on top of the molds 24. The upper molds 34 are of the same diameter as the molds 24 and are aligned with them in the receptacle or basin 21. As shown, the upper molds 34 are also formed with perforations 26 as well as feet 27 at their closed upper ends. As can be seen in FIG. 4, the height of the combined molds 24 and 34 is such that the milk mixture in the receptacle or basin 21 just covers the molds. Also, the upper molds 34 are of considerably less height than the molds 24; and, after the curd 30 has formed it is substantially below the upper level of the molds 24.

When the curdling is complete, the whey 32 is removed from the receptacle or basin 21. Where the curd 30 forms at the bottoms of the molds 24, as shown in FIG. 3, the whey 32 is siphoned out by inserting a flexible tube 35 into or between the molds 24 just above the curd 30 and siphoning the whey out from the receptacle 21 and into a gutter 36. During this siphoning, the whey will flow through the mold perforations 26 so that it may be removed from the molds and the spaces between the molds without moving the tube 35. In the case where the upper molds 34 of FIG. 4 are used, the tube 35 need merely be inserted into one of the spaces between the molds.

It will be appreciated that in this manner all the remaining whey 32 is removed without removal of any significant quantity of the curd 30. The mold block 23 is then removed from the receptacle or basin 21 and is set on a draining plate where draining of whey through the perforations 26 continues through the effects of gravity. The curd 30 on the other hand does not pass through the perforations 26 and remains as cheese within the molds. The feet 27 formed on the bottoms of the molds 24 hold their bottom surfaces a slight distance above the draining plate to permit drainage through the perforations in the bottoms of the molds.

Figure 5:
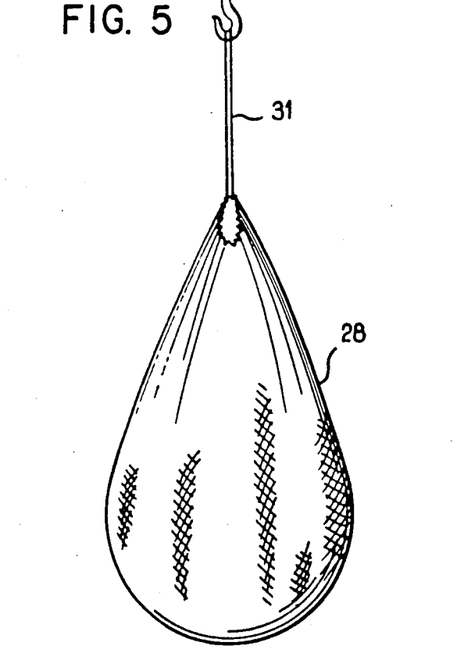
FIG. 5 is a perspective view of a curd draining sack which may be used when carrying out a cheese making process according to the invention.

After the molds 24 have been removed from the receptacle or basin 21, the draining sack 28 is taken out of the receptacle and is suspended by its cord 31 as shown in FIG. 5 to allow it also to drain. The sack 28 contains whey, which can filter through its pores, and curd, which is retained. The curd which is retained in the sack 28 is broken and cannot therefore give cheese of the same quality. However, this remaining curd, which is small in amount compared to that in the molds 24, can nevertheless be used to make extruded cheese or the like.

When whey has stopped draining from the molds 24 of the mold block 23, a group of further molds similar to the molds 34 of FIG. 4, are placed upside down on top of the molds 24. In the case where the molds 34 were used as described in FIG. 4, they are simply left in place over the molds 24. In either case the height of the upper molds is made equal to or slightly greater than that of the cheeses 41 which are at the bottoms of the molds 24 at this phase of the draining.

Figure 6:
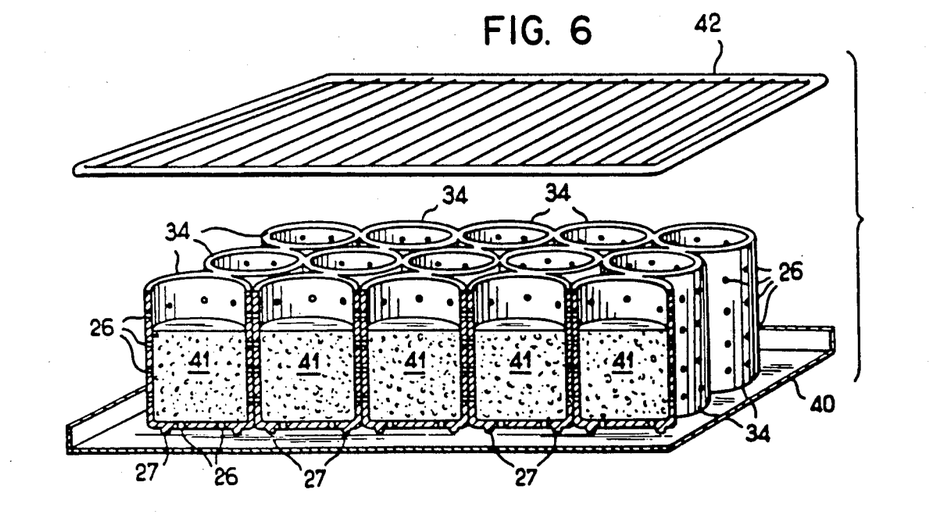
FIG. 6 is a perspective view of a drying mold and rack assembly used in a later stage of a cheese making process according to the invention.

The molds 24 containing the freshly formed cheeses 41 and having the upper molds 34 aligned with them, are inverted together with the upper molds so that the cheeses 41 are reversed and fall into the upper molds as shown in FIG. 6. As can be seen, the cheeses 41 thus continue to drain through the perforations 26 in the upper molds 34 while those molds rest on a draining plate 40.

After the cheese in the molds has been completely drained, a drying rack 42 is placed on top of the molds 34 and the molds 34 and the rack 42 are together inverted to return the cheeses 41 to their original position but resting on the rack 42. The molds block 34 are then removed and the rack 42 is placed in a dryer (not shown).

Figure 7:
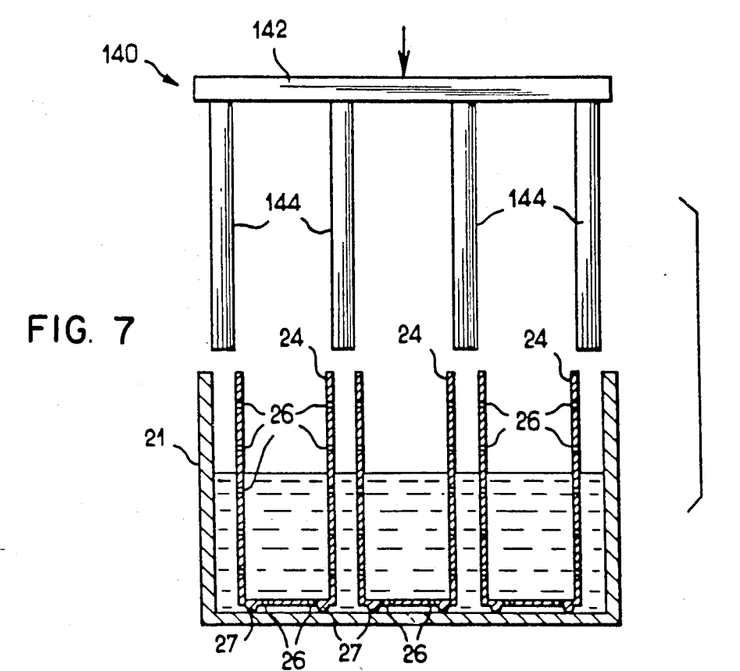
FIG. 7 is a diagrammatic elevational view showing a displacement element about to be inserted into a receptacle or basin containing molds and a curd forming milk mixture.

FIGS. 7-10 show a modification which greatly minimizes any loss of curd by ensuring that virtually all curd formation takes place inside the molds 24 themselves. As shown in FIG. 7 after the molds 24 are positioned in the receptacle or basin 21, the curd forming milk mixture is placed into the basin as previously described. However, as will be noted, the level of the mixture is below the upper level of the molds 24 and the receptacle or basin 21. A displacement member 140, comprising an upper base 142 and a plurality of downwardly projecting rod-like elements 144, is suspended above the molds 24 and the receptacle or basin 21. The cross section of the elements 144 and their spacing conforms to the cross section and spacing of the regions between the molds 24 and between the molds and the receptacle or basin 21.

Figure 8:
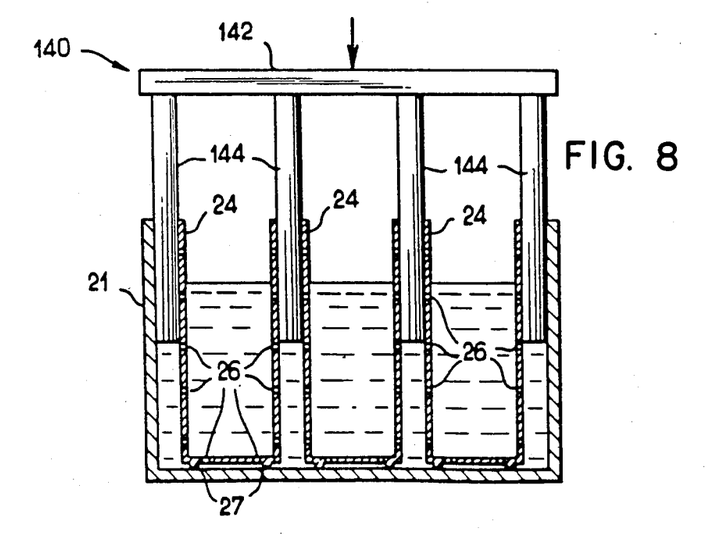
FIG. 8 is a view similar to FIG. 7 showing the displacement element partially inserted into the basin or receptacle.
Figure 9:
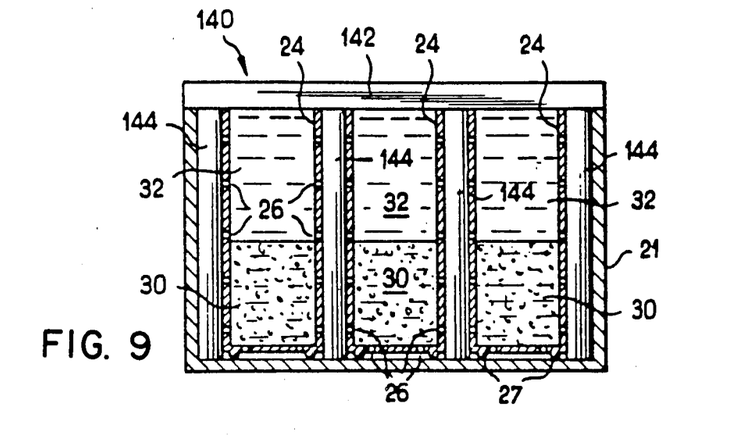
FIG. 9 is a view similar to FIG. 7 showing the displacement element fully inserted into the basin or receptacle.
Figure 10:
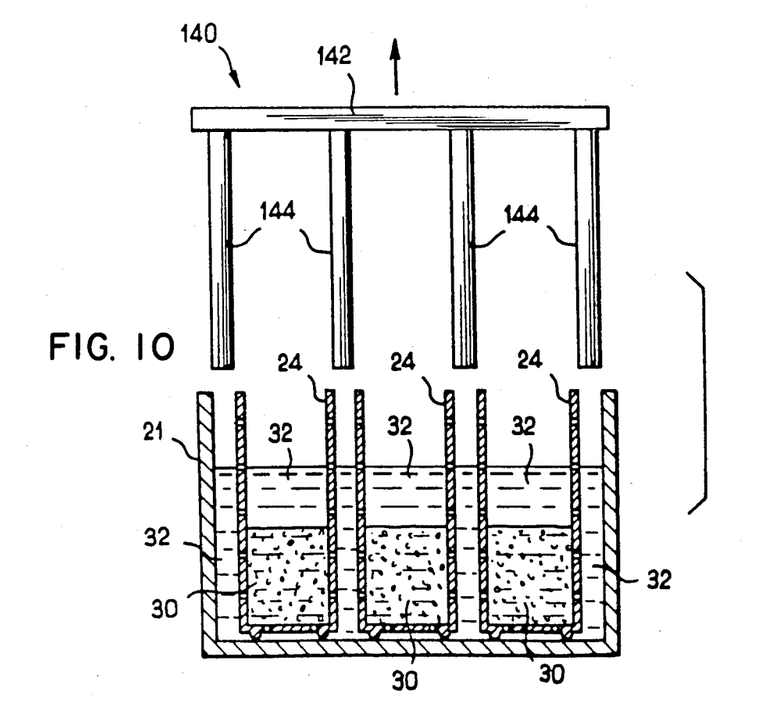
FIG. 10 is a view similar to FIG. 7 showing the removal of the displacement element following curd formation in the basin or receptacle.

As soon as the curd forming milk mixture has been placed in the molds 24 and before any curd begins to form, i.e. within the first few minutes of introduction of the mixture, the displacement member 140 in lowered into the receptacle or basin 21 with the rod like elements 144 entering into the spaces between the molds 24 and into the spaces between the molds and the receptacle on basin 21 as shown in FIG. 8. As the rod-like elements 144 move downwardly they displace the curd forming milk mixture in those spaces back through the preforations 26 in the molds 24 so that the molds now become filled with the curd forming milk mixture as shown in FIG. 9. Preferably the basin is initially filled to a level such that the volume displaced by the rod-like elements 144 will equal the empty volume of the molds so that when the rod-like elements are inserted, the milk mixture which they displace from the spaces between the molds and between the molds and the basin will just fill the molds themselves. The assembly is allowed to remain in this condition until, as shown in FIG. 9, curd 30 and whey 32 forms and separates in the molds 24. After curdling is completed, the displacement member 140 is removed and the whey 32 drains out through the perforations 26 and into the receptacle or basin 21. This whey may then be drained out from the basin via a suitable tap (not shown) and the molds containing the curd 30 are removed and placed on a draining table for further draining and turning.

As a result of the foregoing arrangement and procedure substantially all of the curd is formed in the molds 24 and little, if any, of the curd is required to be separated in a sack. Thus a maximum yield of high quality cheese of unbroken curd is obtained.

It will be appreciated that while the arrangement and procedure of FIGS. 7-10 has been described in conjunction with open top molds such as are shown in FIGS. 1 and 3, the same arrangements and procedures are equally useable with closed top molds such as are shown in FIG. 4.

Figure 11:
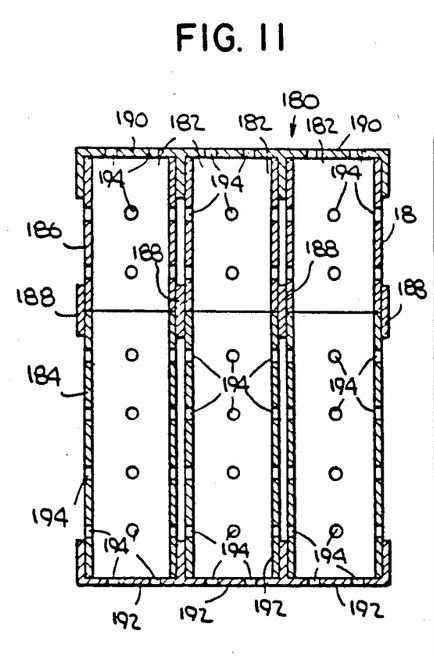
FIG. 11 is a side elevational section view of an alternate mold group according to the invention.
Figure 12:
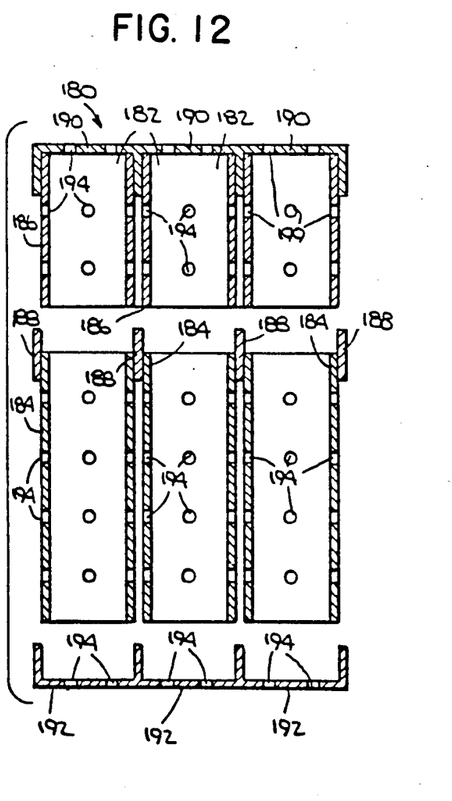
FIG. 12 is a view similar to FIG. 11 but showing the dissassembly of the molds in the mold group.

FIGS. 11 and 12 show modifications which are especially useful for making cheese of relatively large size. As shown, a mold assembly 180 is made up of a group of cylindrical molds 182. Each mold consists of a lower tubular section 184 and a shorter upper tubular section 186 interconnected by a sleeve 188 and closed at their upper and lower ends by caps 190 and 192. Groups of the caps and the sleeves are held together in arrays and the arrangement of each array of caps and each array of sleeves is identical so that they can be placed in alignment with the tubular sections 184 and 186 extending between them. The tubular sections fit closely into the caps and sleeves. It is preferred to have the sleeve 188 fixed to the upper ends of the lower tubular sections 184 and the upper caps 190 fixed to the upper ends of the upper tubular sections 186. This permits the molds to be disassembled as shown in FIG. 12 so that the various parts thereof may be easily and thoroughly washed. The molds may then be reassembled as shown in FIG. 11 by fitting the upper tubular sections 186 into its sleeves 188 and the lower tubular sections 184 into the lower end caps 192.

The caps, sleeves and tubular sections may be made of any suitable material such as aluminum, stainless steel or plastic. Also, as shown, the caps and tubular sections are provided with perforations 194 similar to the perforations 26 in the molds 24 of FIGS. 1, 3, 4 and 6.

It will be appreciated that the tubular sections may be made quite long and of any suitable diameter and yet the end caps 190 and 192 need not be very deep. This makes it possible to form the end caps by drawing or stamping.

As a further modification, the lower end caps 192 may be replaced by disposable perforated cups which extend down from the lower tubular sections 184. In this case an amount of milk mixture is placed in the tubular sections which will produce just enough curd to fill the cups which then are detached and placed in imperforate containers for sale. This arrangement makes possible the production of soft non-dried cheese of very high quality since its curd will be continuous and unbroken throughout.

In the apparatus shown in FIGS. 13-19, molds 204 are formed as perforated tubular sections open at both ends and rigidly, but possibly removably, secured together as an array, this array being rigidly secured in a tubular side wall 201 which can be closed at each end by a cover 203A or 203B. This side wall 201 is rotatably supported in bearings defining an horizontal axis 202 at mid-height and mid-width of said side-wall.

Figure 13:
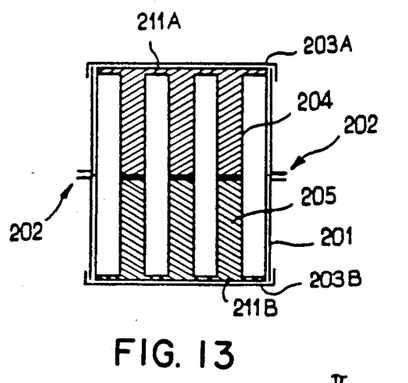
FIGS. 13–17 are diagrammatic side elevational views of an alternate mold assembly, according to this invention, at different stages, respectively, in the manufacture of cheese.

The apparatus also comprises two inter-mold modules 211A and 211B respectively adjacent to the inner face of covers 203A and 203B. Each inter-mold module comprises a plate carrying fingers 205 adapted to closely fit altogether in all the spaces between the molds 204. Each inter mold module, when in working position, occupies one half of the height of the spaces between the molds.

The operation of the apparatus of FIGS. 13-19 is as follows:

In a first step (FIG. 14) the upper cover 203A and the upper inter-mold module 211A are taken away and the curd forming mixture is poured into the device, all the molds filling up directly or via their perforations and the spaces between the molds. This filling occurs up to a level such that the side wall will be full of mixture when, in a second step, the upper inter-mold module 211A is inserted between the molds.

Figure 14:
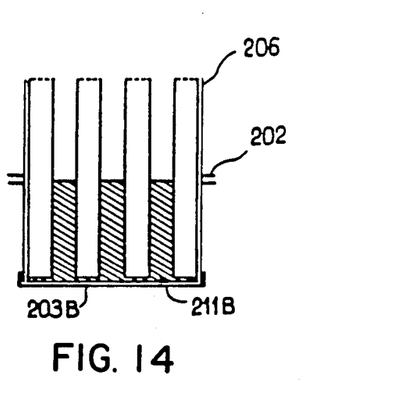

When curd has formed, the upper inter-mold module is taken away and a grid-like cover 206 is mounted at the upper end of the side-wall 201.

The molds are then inverted about axis 202. The grid-like cover 206 is adapted to retain the curd in the mold, but to allow whey to flow therefrom. An example of such a cover, partially shown in FIG. 18, comprises two perpendicular groups of equidistant wires defining square holes having their apexes on the axis of the molds.

Figures 15, 16, 18:
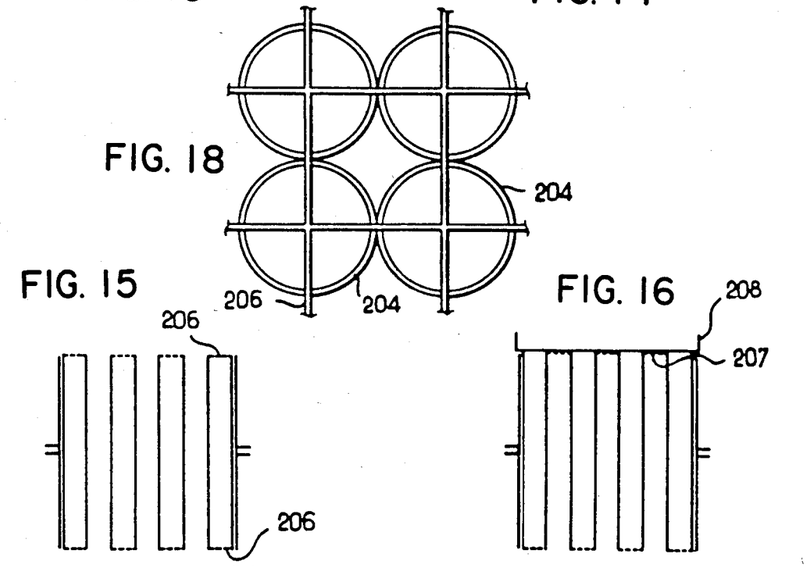
FIGS. 18 and 19 are fragmentary plan views of alternate forms of grid-like cover and piston assemblies for use in the mold assembly of FIGS. 13–17.

The (now upper) inter-mold module 211B and cover 203B are in turn taken away and second grid-like cover 206 is mounted at this end of side-wall 201 (FIG. 15). The molds are once again inverted about axis 202 (FIG. 15) and at the (now upper) end thereof, the cover 206 is replaced by another grid-like cover 207 which is adapted to allow the cheeses to discharge from the molds but retains the molds 204 in the side wall 201 and also retains an eventual small amount of curd which could have formed in one or more spaces between the molds. In the example shown in FIG. 19, the cover 207 is similar to cover 206 except that the apexes of the square holes are now adjacent the spaces between the cylindrical molds while the centers of the square holes are on the axes of the molds.

A conventional drying-rack 208 is placed upon cover 207 with its feet directed upwardly. The cheeses have now dried on both faces and the device is once again inverted about axis 202, thus causing the cheeses 209 to fall on the drying-rack 208.

Figure 20:
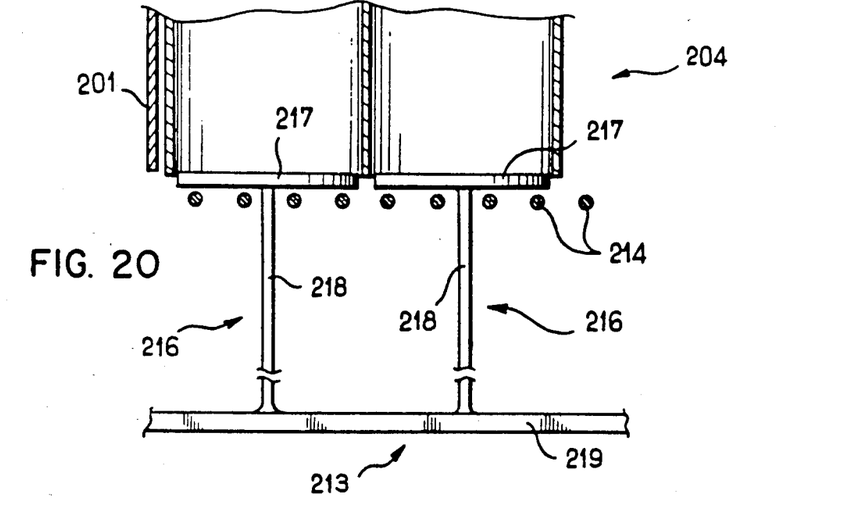
FIG. 20 is a fragmentary elevation view, partly in section, of a novel piston arrangement for use in turning cheeses in apparatus of this invention.

As shown in FIG. 20, there is provided an improved drying-rack 213 made of a grid 214 and an array of parallel pistons 216. Each piston 216 has a head 217 and a rod 218. The rods 218 extend through the grid 214 and are secured to a common support plate 219 while the heads 217 are mutually arranged so as to be able to move together in and out of the respective molds upon movement of the support plate 219. The rods 218, in passing through the individual wires of grid 214, are unremovably attached, together with the pistons 216, to the grid 214.

In operation, the improved drying-rack 213 is placed upon cover 207 with the piston heads 217 being inserted in the tubular sections and plate 219 being removably secured with respect to the side wall 201. The latter is then inverted with the tubular sections and the drying-rack, and then the plate 219 is actuated to progressively fall until piston head 217 rest on the grid 214.

Figure 21:
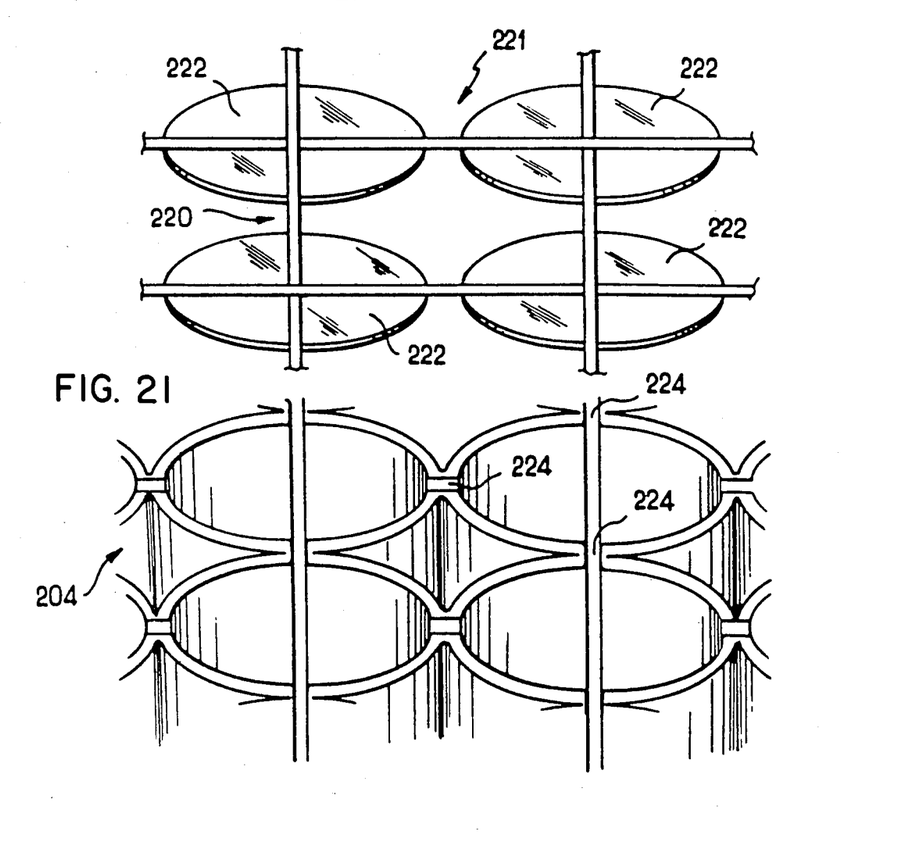
FIG. 21 is an exploded perspective view showing an alternate piston arrangement for use in turning cheeses in apparatus of this invention.

An alternate arrangement is shown in FIG. 21, where the drying-rack 221 is made of a grid 220 like the grid 206 of FIG. 18, but carrying piston heads 222 each having its center on an apex of the grid 220. The piston heads 222 are mutually arranged so as to be able to penetrate in the tubular section of the mold 204. The tubular sections directly communicate with each other by longitudinal slits 224 along the generating lines along which they are assembled.

In operation, the piston heads of the improved drying-rack are inserted in the tubular sections through the upper end thereof while the wire portions of the grid, which are not covered by the piston heads, slide in the slits 224.

The assembly of the molds and the drying-rack is then inverted and then the drying-rack, having received the cheese on the piston heads, is actuated to progressively fall until the cheeses are out of the molds.

In both embodiments of FIGS. 20 and 21, abrupt fall of the cheese in the drying-rack is prevented.

Figure 17:
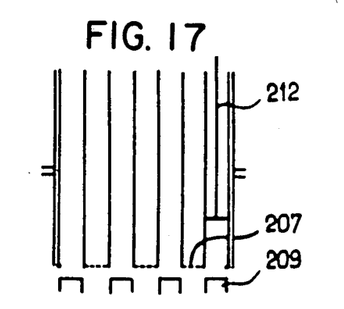
Figure 19:
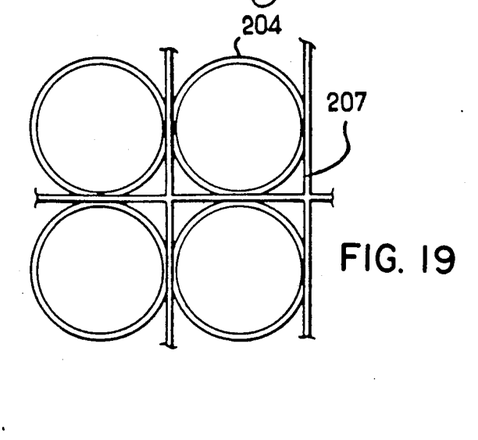

If a cheese does not fall by himself, it is easy to remove the remaining cover 206 and to push such cheese with a piston-like tool 212 as shown in FIG. 17.

As will be readily understood, this device may have any dimensions, for example being adapted for use at home, or on the contrary allow production of many hundreds of cheeses at one time.

When the grid like cover 206 is mounted on the side wall 201, drainage may be expedited by rotating the molds at a desired speed, or angularly shaking the molds about axis 202, or vibrating the molds.

Other modifications are possible and will be readily appreciated by those skilled in the art utilizing the teachings given herein.

What is claimed is:

1. Apparatus for processing soft cheese comprising:
   a plurality of tubular molds having perforations therein for allowing separation of whey from curd formed in the molds;
   means for holding said molds in a liquid container during filling of said molds with a curd forming milk mixture and during curd formation in the molds, said means for holding said molds being constructed to hold the molds in an array with open spaces between the molds to allow whey to drain through said perforations following curd formation in the molds; and a plurality of intermold elements configured to extend into and substantially fill the spaces between the molds during filling thereof to confine the curd forming milk mixture to the interior of the molds, said intermold elements being removable from said spaces after curd has been formed in the molds to permit drainage of whey through said perforations.

2. Apparatus according to claim 1 wherein said molds are closed at their lower ends and are open at their upper ends.

3. Apparatus according to claim 1 wherein said molds are cylindrical and are closed at each end.

4. Apparatus according to claim 3 wherein said molds are provided with removable end caps.

5. Apparatus according to claim 4 wherein said end caps are held together in an array.

6. Apparatus according to claim 1 wherein said liquid container comprises a basin-like receptacle for containing said molds and said curd forming milk mixture and wherein said molds are removable from said receptacle.

7. Apparatus according to claim 6 further including a heater adjacent said receptacle for maintaining the curd forming milk mixture at a temperature sufficient to cause curd and whey to form in said molds.

8. Apparatus according to claim 7 wherein said heater is an electrical resistance heater placed against the bottom surface of said receptacle.

9. Apparatus according to claim 1 and further including means for placing a curd forming milk mixture in said molds, said means comprising a funnel, means for supplying milk to flow tangentially about the inner surface of said funnel and means for causing curd additives to pour onto the milk flowing in said funnel.

10. Apparatus according to claim 1 wherein said molds each comprise two aligned cylindrical portions held together by a sleeve.

11. Apparatus according to claim 1 wherein the molds comprise first and second groups of closed bottom, open top perforated mold portions of the same cross section and held in like arrays with the second group of mold portions being inverted and placed over the upper ends of the mold portions of the first group to form an array of enclosed molds.

12. Apparatus according to claim 11 wherein the vertical height of the molds in said second group is less than the vertical height of the molds in said first group.

13. Apparatus according to claim 6 wherein a removable draining sack lines the interior of said receptacle.

14. Apparatus according to claim 1 wherein said molds are provided with removable end covers which permit draining but retain curd in the molds.

15. Apparatus according to claim 1 comprising a drying-rack having pistons adapted to enter the molds for supporting the cheeses.

16. Apparatus according to claim 1 wherein said molds are provided with a drying rack and associated pistons mounted to move inside the molds to allow inversion thereof without abrupt falling of the cheeses therein.

17. Apparatus according to claim 16 wherein a plurality of said pistons are mounted on associated piston rods which pass through said drying rack and are connected to a common support.

18. Apparatus according to claim 16 wherein said pistons are affixed to said drying rack and wherein said molds are formed with longitudinal slots in alignment with said drying racks to permit said drying racks to move relative to the molds in an axial direction to move said pistons through the molds.

19. Apparatus according to claim 1 wherein said intermold elements are supported on and extend from a common base.

* * * * *